United States Patent
Dragas et al.

(10) Patent No.: US 10,470,054 B2
(45) Date of Patent: Nov. 5, 2019

(54) MOBILE COMMUNICATIONS TRANSMISSION SYSTEM FOR PROVIDING A MULTIPLICITY OF MOBILE COMMUNICATIONS CELLS IN A BUILDING OR CAMPUS

(71) Applicants: Kathrein-Werke KG, Rosenheim (DE); m3connect GmbH, Aachen (DE)

(72) Inventors: Emilio Dragas, Roetgen (DE); Andreas Lankes, München (DE); Alexander Seeor, Kolbermoor (DE); Johann Schmid, Riedering (DE); Christian Wagner, Kolbermoor (DE)

(73) Assignees: Kathrein SE, Rosenheim (DE); m3connect GmbH, Aachen (DE)

( * ) Notice: Subject to any disclaimer, the term of this patent is extended or adjusted under 35 U.S.C. 154(b) by 90 days.

(21) Appl. No.: 15/625,629

(22) Filed: Jun. 16, 2017

(65) Prior Publication Data

US 2018/0007719 A1  Jan. 4, 2018

(30) Foreign Application Priority Data

Jun. 17, 2016 (DE) ........................ 10 2016 111 142

(51) Int. Cl.
*H04W 16/24* (2009.01)
*H04W 8/02* (2009.01)
(Continued)

(52) U.S. Cl.
CPC ............. *H04W 16/24* (2013.01); *H04L 12/14* (2013.01); *H04L 12/1403* (2013.01);
(Continued)

(58) Field of Classification Search
CPC .. H04L 63/0892; H04W 12/06; H04W 16/24; H04W 4/24
See application file for complete search history.

(56) References Cited

U.S. PATENT DOCUMENTS

2004/0181663 A1* 9/2004 Pienimaki ........... H04L 12/2856
                                                    713/155
2008/0069105 A1* 3/2008 Costa .................. H04L 63/0853
                                                    370/392

(Continued)

FOREIGN PATENT DOCUMENTS

EP       2 875 668 A1    5/2015
WO   2014/012561 A1    1/2014

OTHER PUBLICATIONS

Ala-Laurila, Juha, et al., "Wireless LAN Access Network Architecture for Mobile Operators," IEEE Communications Magazine, Nov. 2001, pp. 82-89, XP55420591A.

(Continued)

*Primary Examiner* — Asad M Nawaz
*Assistant Examiner* — Berhanu D Belete
(74) *Attorney, Agent, or Firm* — Nixon & Vanderhye P.C.

(57) ABSTRACT

A mobile communications transmission system provides a plurality of mobile communications cells in a building or campus. It comprises a first baseband unit and a first gateway device, which is connectable to a data network. At least one transceiver unit is connected to the first baseband unit. The at least one transceiver unit is configured to provide at least one first mobile communications cell. By way of this first mobile communications cell, a subscriber device in the building can exchange information with the data network. A first control device is connected to the first baseband unit and the first gateway device. The first baseband unit and the first gateway device are installed in the building or campus in which the at least one transceiver unit provides the at least one first mobile communications cell, whereas the first control device is accommodated remote therefrom at an operating company.

19 Claims, 6 Drawing Sheets

(51) Int. Cl.

| | | |
|---|---|---|
| *H04W 4/24* | (2018.01) | |
| *H04W 76/10* | (2018.01) | |
| *H04L 12/14* | (2006.01) | |
| *H04M 15/00* | (2006.01) | |
| *H04M 17/02* | (2006.01) | |
| *H04M 17/00* | (2006.01) | |
| *H04L 29/06* | (2006.01) | |
| *H04W 12/06* | (2009.01) | |
| *H04W 88/16* | (2009.01) | |
| *H04W 84/10* | (2009.01) | |
| *H04W 84/12* | (2009.01) | |

(52) U.S. Cl.
CPC ......... *H04M 15/00* (2013.01); *H04M 15/49* (2013.01); *H04M 17/02* (2013.01); *H04M 17/103* (2013.01); *H04W 4/24* (2013.01); *H04W 8/02* (2013.01); *H04W 76/10* (2018.02); *H04L 63/0892* (2013.01); *H04W 12/06* (2013.01); *H04W 84/105* (2013.01); *H04W 84/12* (2013.01); *H04W 88/16* (2013.01)

(56) References Cited

U.S. PATENT DOCUMENTS

| | | | |
|---|---|---|---|
| 2008/0081592 A1 | 4/2008 | Das et al. | |
| 2009/0074006 A1* | 3/2009 | Qi | H04L 1/0004 370/464 |
| 2009/0077444 A1* | 3/2009 | Qi | H04L 1/0057 714/748 |
| 2010/0080152 A1* | 4/2010 | Lindh | H04L 1/1812 370/280 |
| 2010/0093364 A1* | 4/2010 | Ribeiro | H04W 72/082 455/452.2 |
| 2010/0220643 A1* | 9/2010 | Qi | H04W 72/005 370/312 |
| 2010/0278221 A1* | 11/2010 | Ql | H04L 5/0007 375/219 |
| 2011/0039589 A1* | 2/2011 | Skov | H04W 52/146 455/501 |
| 2011/0065400 A1 | 3/2011 | Teikari et al. | |
| 2011/0069630 A1* | 3/2011 | Doppler | H04W 16/14 370/252 |
| 2011/0090879 A1* | 4/2011 | Hamiti | H04B 7/2656 370/338 |
| 2012/0017009 A1* | 1/2012 | Short | H04L 63/08 709/238 |
| 2012/0076047 A1 | 3/2012 | Turányi et al. | |
| 2012/0096159 A1* | 4/2012 | Short | H04L 63/08 709/225 |
| 2012/0166618 A1* | 6/2012 | Dahod | H04L 12/66 709/224 |
| 2012/0303812 A1* | 11/2012 | Short | H04L 63/08 709/225 |
| 2012/0311152 A1* | 12/2012 | Short | H04L 63/08 709/225 |
| 2013/0055358 A1* | 2/2013 | Short | H04L 63/08 726/4 |
| 2013/0072185 A1 | 3/2013 | Picker et al. | |
| 2013/0107783 A1* | 5/2013 | Shaw | H04W 4/06 370/312 |
| 2013/0148551 A1* | 6/2013 | Lindh | H04L 1/1812 370/277 |
| 2014/0036873 A1* | 2/2014 | Cheng | H04W 36/0022 370/331 |
| 2014/0047093 A1* | 2/2014 | Short | H04L 63/08 709/223 |
| 2014/0059222 A1* | 2/2014 | Short | H04L 63/08 709/225 |
| 2014/0089182 A1* | 3/2014 | Short | H04L 63/08 705/40 |
| 2015/0029879 A1* | 1/2015 | Chou | H04W 4/70 370/252 |
| 2015/0088710 A1* | 3/2015 | Short | H04L 63/08 705/34 |
| 2015/0195858 A1* | 7/2015 | Jin | H04L 41/5051 370/230 |
| 2015/0208279 A1* | 7/2015 | Lindoff | H04W 28/08 370/235 |
| 2015/0236965 A1* | 8/2015 | Short | H04L 63/08 709/233 |
| 2015/0245372 A1* | 8/2015 | Desai | H04B 1/406 370/338 |
| 2015/0282042 A1 | 10/2015 | Griot et al. | |
| 2015/0326296 A1* | 11/2015 | Thiele | H04B 7/024 370/328 |
| 2016/0057121 A1* | 2/2016 | Metsala | H04L 63/0823 713/175 |
| 2016/0088664 A1* | 3/2016 | Rydnell | H04W 4/70 370/328 |
| 2016/0173361 A1 | 6/2016 | Somasundaram et al. | |
| 2016/0204917 A1* | 7/2016 | Lindh | H04L 1/1812 370/329 |
| 2016/0337485 A1* | 11/2016 | Nuggehalli | H04L 47/825 |
| 2017/0188270 A1* | 6/2017 | Shan | H04L 65/1016 |
| 2017/0230250 A1* | 8/2017 | Short | H04L 63/08 |
| 2018/0041395 A1* | 2/2018 | Short | H04L 63/08 |

OTHER PUBLICATIONS

Zaidi, Zainab R., et al., "An Integrated Approach for Functional Decomposition of Future RAN," Energy Management in Wireless Cellular and Ad-hoc Networks edited by Muhammad Zeeshan Shakir, et al., 2016, pp. 123-144, XP55413238A.

"C-Ran: Difference between revisions," Wikipedia, revisions as of Nov. 16, 2015 and Nov. 17, 2015, 7 pages, XP55417098A.

* cited by examiner

MOBILE COMMUNICATIONS TRANSMISSION SYSTEM FOR PROVIDING A MULTIPLICITY OF MOBILE COMMUNICATIONS CELLS IN A BUILDING OR CAMPUS

CROSS-REFERENCE TO RELATED APPLICATIONS

This application claims priority to DE Patent Application No. 10 2016 111 142.2 filed 17 Jun. 2016, the entire contents of which is hereby incorporated by reference.

STATEMENT REGARDING FEDERALLY SPONSORED RESEARCH OR DEVELOPMENT

None.

FIELD

The technology herein relates to a mobile communications transmission system by means of which a multiplicity of mobile communications cells can be provided in a building or campus.

BACKGROUND & SUMMARY

In some buildings, such as shopping centers or hotels, many people are accommodated in a small space. This leads to the difficulty in providing data services for all these people which make it possible to connect the subscribers at a sufficiently high speed. An additional complication is that, because of a lack of glass surfaces, shopping centers for example can only be covered poorly by external base stations. Meanwhile, a similar set of problems also occurs in buildings which do have large-area glass surfaces but in which these glass surfaces are covered with various metal layers (for example copper layers) so as to minimize the cooling or heating of the building by external weather effects. This increases the heat transmission resistance, making it possible to reduce power costs for cooling or heating. However, the use of coatings of this type which have a shielding effect is associated with worse mobile communications reception in the interior of the building.

For this reason, a transition is being made to installing appropriate mobile communications antennas inside shopping centers, office buildings and hotels.

In known installations, merely the transceiver unit or BBU is operated locally, in other words inside the building or campus. All the other units required for a mobile communications connection are still operated centrally with the service provider. This means that both a connection for the control plane and a connection for the user plane or data plane have to be transmitted centrally to the service provider.

A configuration of this type requires a suitably wide-band connection to the service provider. This is even more complex if a plurality of mobile communications providers wish to provide their services within the same building.

Example non-limiting implementations herein therefore provide a mobile communications transmission system by means of which a multiplicity of mobile communications cells can be provided in a building or campus, it being intended for the installation costs to be lower than in currently used systems. A campus means a plurality of adjacent and/or associated building complexes and optionally also the area directly between these building complexes.

In some non-limiting embodiments, the mobile communications transmission system comprises at least a first baseband unit and a first gateway device, the first baseband unit being connectable or connected via the first gateway device to a data network, in particular the Internet. Via the first gateway device, user data are transmitted into and out of the data network. At least one transceiver unit is directly or indirectly connected to the first baseband unit. For a direct connection the transceiver unit is connected directly to the baseband unit, whereas for an indirect connection a processing and/or distribution device (for example HUB) is connected in between. The at least one transceiver unit is configured to provide at least a first mobile communications cell. By way of this first mobile communications cell, information can be exchanged with at least one subscriber device at or close to the building via a mobile communications connection. Via this mobile communications connection, a data connection between the at least one subscriber device and the data network is established via the first baseband unit. The mobile communications transmission system further comprises a first control device which is connected to the first baseband unit and the first gateway device. The first baseband unit and the first gateway device are installed in the building or campus in which the at least one transceiver unit provides the at least one first mobile communications cell. The first control device is accommodated at the base, in other words at an operating company remote from the building or campus of the first baseband unit, the at least one transceiver unit and the first gateway device. This means that the first control device is arranged outside the building or campus.

A connection to the Internet is provided locally, in other words from the building or campus. The data which the subscriber device wishes to transmit to the Internet no longer have to be routed via the operating company. In the simplest case, for this purpose a (V)DSL, connection on the site of the building or campus could be used, via which the data connection of the individual subscriber devices within the building or campus to the Internet is established. Merely the control device, which is also the control plane, is kept centrally at an operating company. This control device is for controlling not only the one first baseband unit, but preferably a plurality of baseband units in different buildings. The volume of data accumulated for this purpose is much less than the volume of data transmitted to and received from the data network, in other words the Internet, by the subscriber devices. Therefore, the connection to the operating companies, via which only the control data are transmitted, can be much narrower-band than the connection to the data network. This leads to a significant cost reduction.

The mobile communications cells are preferably LTE (long-term evolution) communications cells. In this case, the first control device comprises a first mobility management entity (MME) and a first home subscriber server (HSS). By contrast, the first gateway device comprises a first serving gateway (S-DW) and a first packet data network gateway (PDNGW).

The first control device preferably further comprises a first authentication, authorization and accounting device (for example a 3GPP AAA server).

Via the MME and the HSS, the subscriber device inside or close to the building is identified and authorized. The MME is connected to the HSS and simultaneously to the baseband unit and the serving gateway. The subscriber device can only transmit data via the serving gateway to the packet data network gateway if said device is positively authenticated and authorized.

The at least one subscriber device is preferably an access point. The at least one access point is configured to communicate via the first mobile communications cell with the at least one transceiver unit. This mobile communications connection may also be referred to as a backhaul connection. The access point is further configured to provide a WLAN connection (IEEE 802.11) for at least one mobile terminal. The first MME is thus configured to authorize access from the at least one access point via the first mobile communications cell and the first baseband unit and the first serving gateway and the first packet data network gateway to the access gateway. The access gateway is optional and may be downstream from the packet data network gateway. The first control device preferably further comprises an accounting system which is connected to the access gateway and the authentication, authorization and accounting system. The accounting system is configured to control the access gateway in such a way that the at least one mobile terminal can transmit data to the data network via the WLAN connection of the at least one access point. For this purpose, the mobile terminal has to authenticate itself to the access gateway. For example, in the simplest case, the access gateway may preceded by a password page, it only being possible to establish a connection to the data network once the correct password is entered. It is also possible to use an EAP-based method, in particular an EAP SIM (extensible authentication protocol SIM) method or an EAP AKA (authentication and key agreement) method, the mobile terminal transmitting the information contained in or acquired from the USIM (universal subscriber identity module), in particular the information required for identification, to the access gateway. This passes the conveyed information on to the accounting system, which is in turn connected to the authentication, authorization and accounting device. The authentication, authorization and accounting device validates this data with the authentication, authorization and accounting device of the mobile communications company with which the mobile terminal is registered. If validation is successful, the access gateway is unlocked, and the accounting takes place using the account with the mobile communications company.

It is particularly advantageous for the subscriber device to be an access point. This access point preferably likewise comprises a SIM card via which it authenticates itself to the first MME, whereby the access point is permitted to pass data to the packet data network. The access point itself in turn opens a WLAN (Wi-Fi) connection, whereby conventional mobile terminals, including for example laptops or smartphones, can establish a connection to the access gateway. It is particularly advantageous that there is no additional network wiring to the access points. This ensures lower installation costs, since in particular in large buildings the fire prevention requirements are easier to meet. It is merely necessary to establish a wired connection between the first baseband unit and the at least one transceiver unit. Preferably, an access point may for example be provided in each hotel room, and may in turn communicate with the at least one transceiver unit via a mobile communications connection, for example LTE or LTE-A or LTE Advanced Pro. As a result, it is possible to keep the signal strength of the access point in the room in question to a minimum while still providing excellent WLAN reception.

Because the accounting device is also accommodated centrally at the operating company, the administrative expense inside the building or campus for this purpose is kept to a minimum.

The first baseband unit is preferably operated by the company, which also operates the access points and provides the WLAN connection inside the building or campus. This company may also simultaneously be a mobile communications company. However, this does not have to be the case.

It is further possible for at least one second and/or at least one further baseband unit and a second and/or at least one further gateway device to be installed, the second and/or the at least one further baseband unit being connectable or connected to the data network via the second and/or the at least one further gateway device. This data network may be the same data network to which the first gateway device is connected. However, it may also be a further data network. The second and/or the at least one further baseband unit are directly or indirectly connected to the at least one transceiver unit. The at least one transceiver unit is in this case configured to provide a second and/or at least one further mobile communications cell. By way of these mobile communications cells, further subscriber devices internal to or close to the building can establish a data connection to the data network via the second and/or the at least one further baseband unit. This means that the at least one transceiver unit provides various mobile communications cells at different frequencies. The at least one transceiver unit, which in the simplest case is merely an antenna, is therefore configured to be appropriately wide-band. Further, in this embodiment, there is a second and/or at least one further control device, said devices being connected to the second and/or the at least one further baseband unit and/or to the second and/or the at least one further gateway device. The second and/or the at least one further baseband unit and the second and/or the at least one further gateway device are installed in the building or campus in which the at least one transceiver unit provides the multiplicity of mobile communications cells. By contrast, the second and/or the at least one further control device is accommodated remote from the site of the second and/or the at least one further baseband unit, at the same or at least one other operating company.

It is particularly advantageous that a plurality of baseband units can be connected to a transceiver unit. These further baseband units may be operated by different mobile communications companies. These baseband units provide signals at different frequencies, which are broadcast by the transceiver unit, resulting in a mobile communications cell being formed. In these further mobile communications cells, too, the components of the user plane are installed inside the building or campus, whereas the components of the control plane are accommodated centrally at the associated operating companies. As a result, for the user data a local Internet connection can be installed at the location of the building or campus, whereas the corresponding control data are conveyed to the operating company via the control plane via a narrower-band data line.

In a further embodiment, the second and/or the at least one further mobile communications cell are operated by the transceiver unit in a frequency range assigned to at least one mobile communications company which offers mobile communications services outside the building or campus. In this case, a user of the corresponding mobile communications company does not even notice that he has been registered with a mobile communications cell inside the building or campus. Calls and data services continue to be provided and are available.

In a further embodiment, the first mobile communications cell is not operated by a mobile communications company available at the location of the building or campus. It is therefore advantageous for the first mobile communications cell to be operated in a frequency range which is not used by mobile communications companies outside the building or campus.

The second and/or the at least one further control device likewise comprise a second and/or at least one further mobility management entity (MME) and a second and/or at least one further home subscriber server (HSS). The second and/or the at least one further control device further comprise a second and/or at least one further authentication, authorization and accounting device. Preferably, the authentication, authorization and accounting devices of all the control devices are interconnected for data exchange. As a result, for example, a customer of a mobile communications company can use the infrastructure of another mobile communications company, it being possible to account for the consumed data volume accordingly.

The second and/or the at least one further gateway device further comprise a second and/or at least one further serving gateway and a second and/or at least one further packet data network gateway. The second and/or the at least one further packet data network gateway are connected to the data network in this case, there is preferably no access gateway between the second and/or the at least one further packet data network gateway. Therefore, the second and/or the at least one further packet data network gateway are directly connected or connectable to the data network.

In a further embodiment, the mobile communications transmission system further comprises a processing and/or distribution device (central hub) which is connected to all the baseband units and to the at least one transceiver unit. The processing and/or distribution device is configured to pass on the signals generated by the first baseband unit to the corresponding at least one transceiver unit. Preferably, the processing and/or distribution device itself determines the corresponding transceiver unit to which the associated subscriber signal should be passed on.

The processing and/or distribution device is configured to pass on the signals received by the at least one transceiver unit from the first mobile communications cell or from the further mobile communications cells to the first baseband unit or the further baseband units. If a signal is received via the first mobile communications cell, it is passed on to the first baseband unit. The same applies to the received signals in the second or the at least one further mobile communications cell. These are passed on to the second or to the at least one further baseband unit.

The processing and/or distribution device may further be configured to amplify the amplitude and/or convert the frequency of a signal. This applies to signals which arrive from the at least one transceiver unit, as well as to signals which are generated by the associated baseband unit and are to be passed on to the at least one transceiver unit.

Preferably, there is a multiplicity of further transceiver units which are connected to the processing and/or distribution device and are configured to provide a multiplicity of mobile communications cells. Each transceiver unit can provide a plurality of mobile communications cells at different frequency ranges. These mobile communications cells are preferably configured as microcells, and cover a region having a diameter of less than 50 m, preferably of less than 40 m and more preferably of less than 30 m.

The at least one subscriber device may also be a further mobile terminal. In this case, the further mobile terminal is configured to establish a mobile communications connection to the second and/or the at least one further baseband unit via the second and/or the at least one further mobile communications cell. In this case, the access points would not be used.

The further mobile terminals therefore use different mobile communications cells by comparison with the access points. The second and/or the at least one further mobility management entity are thus configured to allow access of the at least one further mobile terminal via the second and/or the at least one further mobile communications cell, the second and/or the at least one further baseband unit, the second and/or the at least one further serving gateway, and the second and/or the at least one further packet data network gateway to the data network.

In this case, it is particularly advantageous that, in the mobile communications transmission system according to example embodiments, known mobile communications companies and local LAN operators can both offer their services inside their building or campus without interfering with one another, these services being managed centrally outside the building or campus at the mobile communications companies or at the provider of the WLAN connection. As a result, the installation expense inside the building or campus can be kept to a minimum.

BRIEF DESCRIPTION OF THE DRAWINGS

Various non-limiting embodiments are described by way of example in the following with reference to the drawings. Like subject matters have like reference numerals. In the corresponding drawings, in detail.

DETAILED DESCRIPTION OF NON-LIMITING EMBODIMENTS

Figure 1:
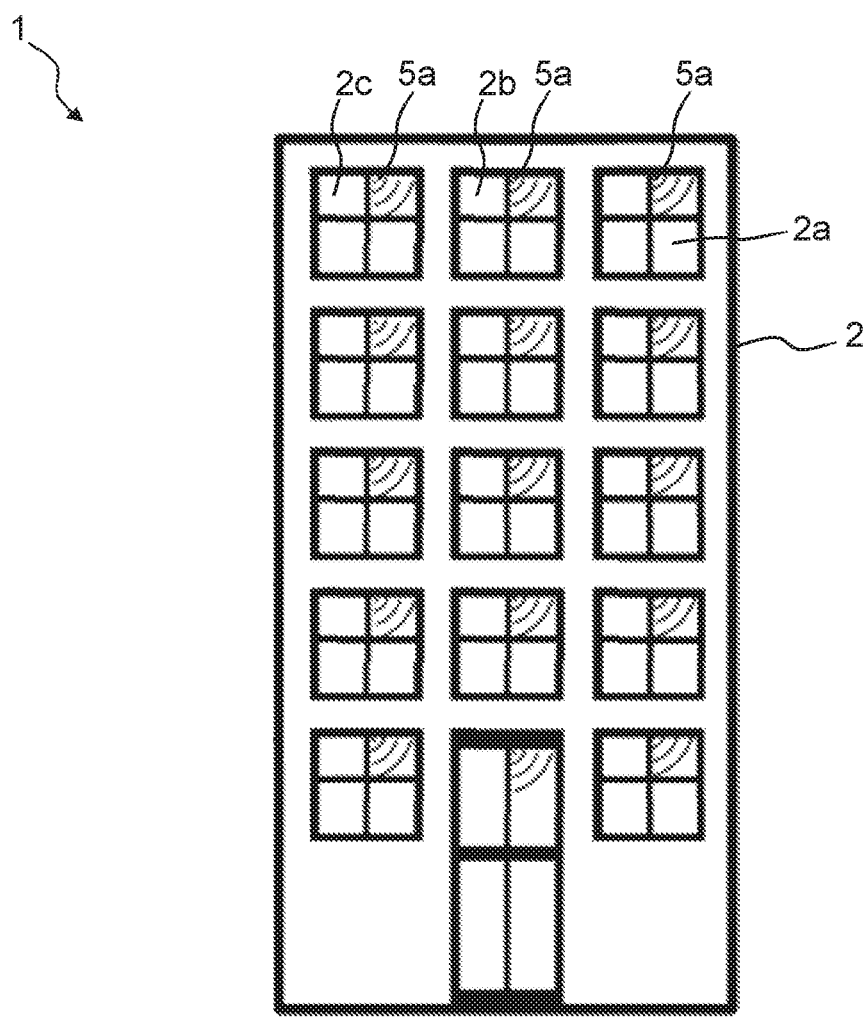
FIG. 1 shows a building in which the mobile communications transmission system is installed.

FIG. 1 shows the mobile communications system 1, which is installed in a building 2 or campus. In this context, a campus comprises a plurality of preferably adjacent buildings or building complexes. The mobile communications transmission system 1 generates at least one, preferably a multiplicity of mobile communications cells 1a, 1b, 1c (see FIG. 3), which are operated at different frequency ranges. Inside the building 2, which is preferably a hotel, a shopping center or an office complex, the mobile communications transmission system 1 ensures mobile communications and/or WLAN coverage, as is described below. The mobile communications cells 1a, 1b, 1c are preferably microcells, which cover a region of which the diameter is less than 50 m, preferably less than 40 m, more preferably less than 30 m. Because the mobile communications transmission system 1 is installed inside the building 2, the outer walls and covered windows thereof do not have a negative effect on the reception quality within the building 2.

Figure 2:
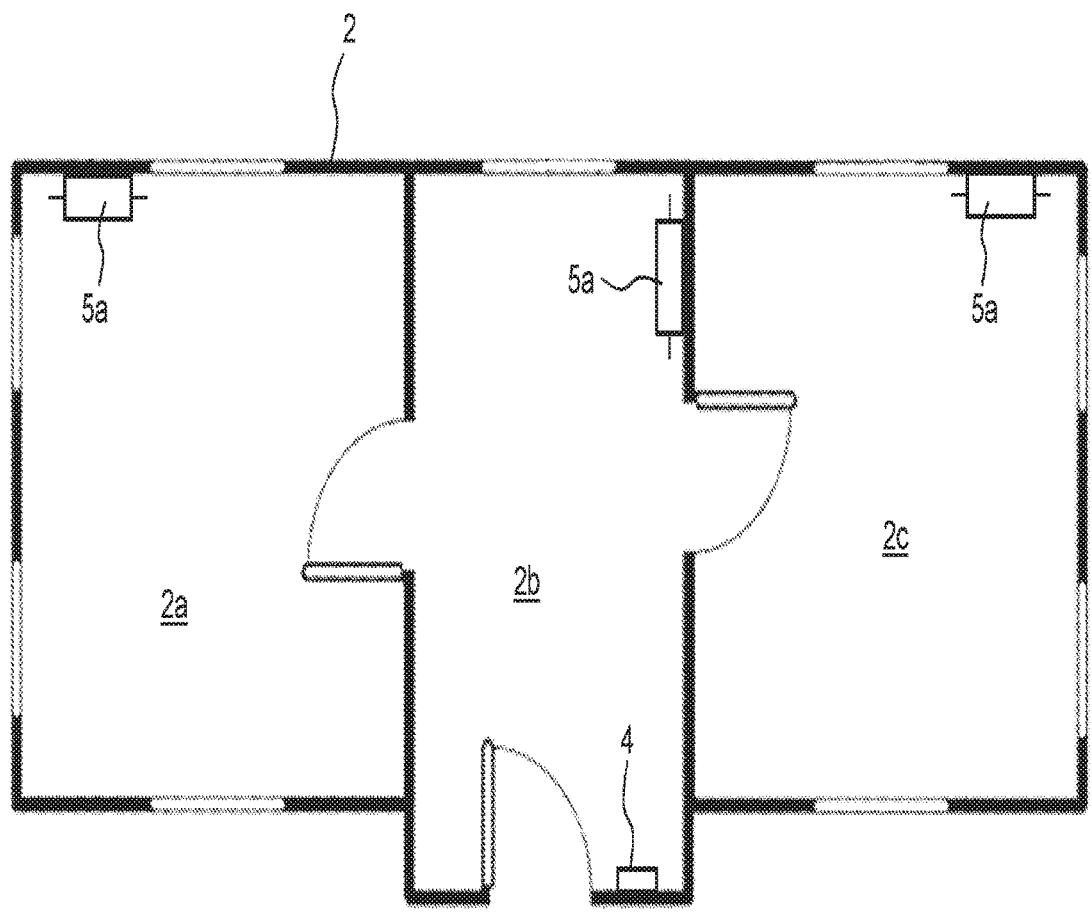
FIG. 2 shows various spaces in the building, a subscriber device in the form of an access point being mounted in each space and being in contact with a shared transceiver unit via a mobile communications connection.

FIG. 2 is a simplified drawing of various spaces 2a, 2b, 2c within the building 2. It is shown that a transceiver unit 4 is installed in one of these spaces 2b. The at least one transceiver unit 4 is configured to provide at least a first mobile communications cell 1a. By way of this first mobile communications cell 1a, information can be exchanged with at least one subscriber device 5a, 5b, 5c internal to or close to the building via a mobile communications connection. In this case, the subscriber device 5a internal to or close to the building is preferably an access point 5a.

Preferably, there is an access point 5a of this type in each room of the building 2 in which a wireless WLAN connection to a subordinate data network 6 (see FIG. 4) is to be established. Because there is preferably such an access point 5a in each of these rooms 2a, 2b, 2c, it can be operated at a lower transmission power than if an access point 5a had to supply a plurality of rooms 2a, 2b, 2c jointly.

It is further particularly advantageous that the access point 5a is connected to the at least one transceiver unit 4 via a wireless mobile communications connection. As a result, additional wiring between the at least one transceiver unit 4 and the associated access points 5a which provide a WLAN connection is not required. The resulting reduction in wiring complexity has a positive effect on the installation costs particular the fire protection design).

Figure 3:
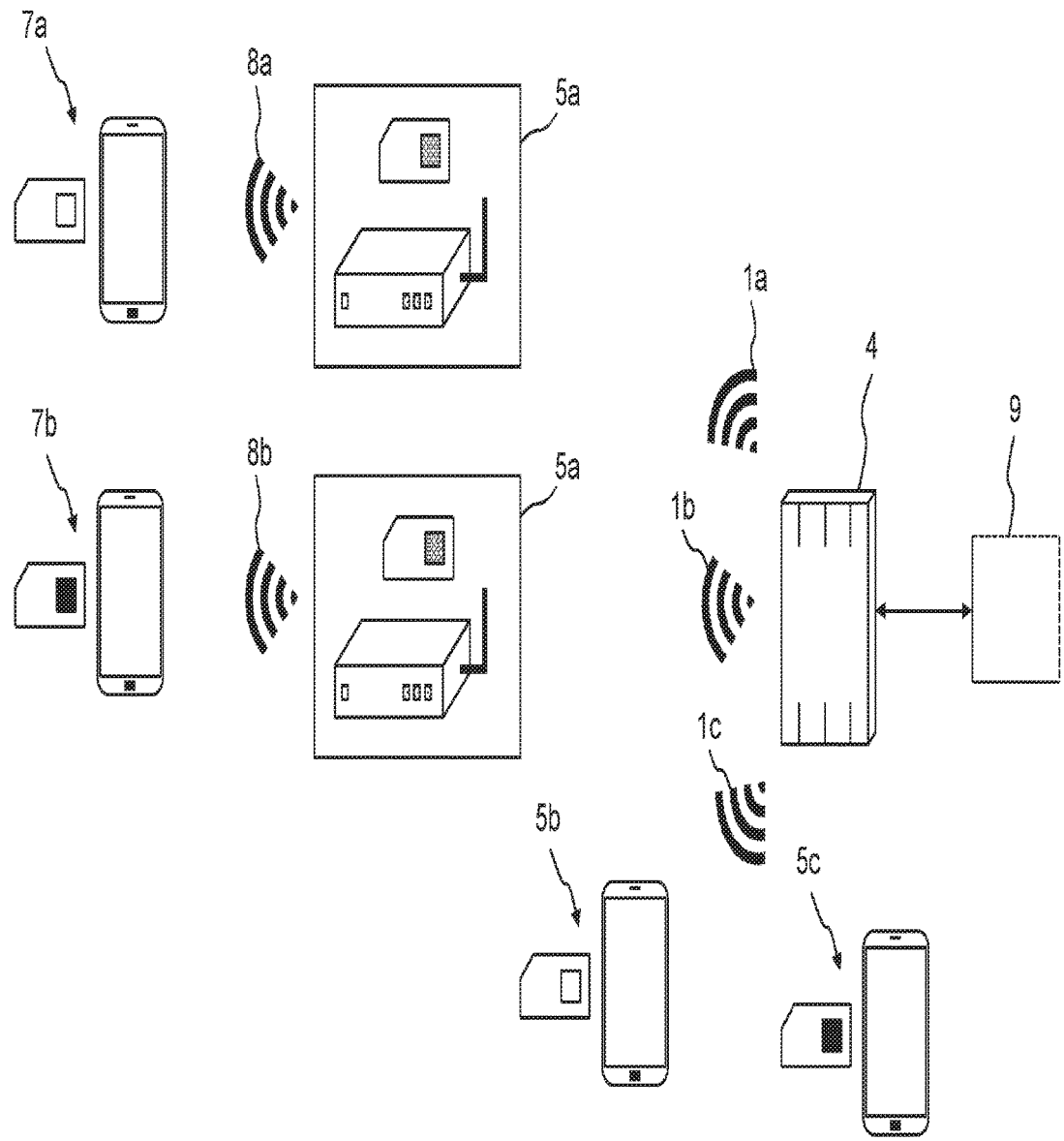
FIG. 3 is an overview of the subscriber devices connected to the at least one transceiver unit.

FIG. 3 shows a transceiver unit 4. In this embodiment, this at least one transceiver unit 4 provides three mobile communications cells 1a, 1b, 1c. These mobile communications cells 1a, 1b, 1c are preferably LTE communications cells 1a, 1b, 1c. Via these mobile communications cells 1a, 1b, 1c, the transceiver unit is connected or connectable to subscriber devices 5a, 5b, 5c internal to or close to the building. "Subscriber device 5a, 5b, 5c internal to the building" refers to subscriber devices 5a, 5b, 5c located inside the building 2. "Subscriber device 5a, 5b, 5c close to the building" refers to subscriber devices 5a, 5b, 5c located in the direct vicinity of the building 2, such as on a (roof) terrace or in an inner courtyard.

Via a first mobile communications cell 1a, a mobile communications connection is established between the at least one transceiver unit 4 and the access points 5.

Figure 4:
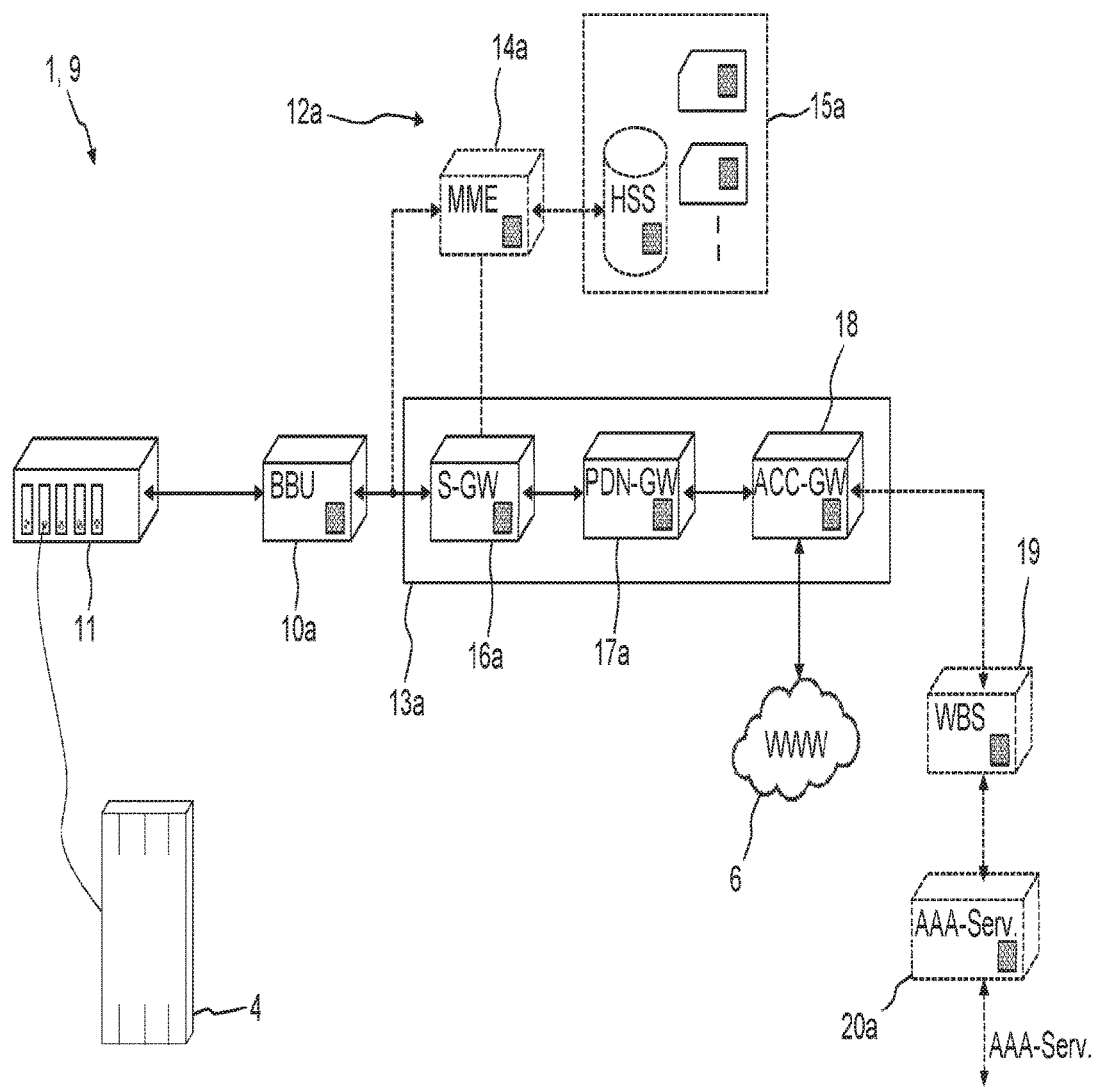
FIG. 4 is an overview of the mobile communications system along with a first baseband unit and the associated components of the control device and the gateway device.

FIG. 4 and the following drawings show the assignment of the individual devices using an illustration of a SIM card. The chip on the SIM card is shown dotted, empty or solidly filled. As is explained further in the following, this represents the assignment of the individual devices to different operating networks (different mobile communications companies).

The subscriber devices 5a, which are preferably the access points 5a, preferably communicate with the at least one transceiver unit 4 exclusively via a first mobile communications cell 1a. Further subscriber devices 5b, 5c, which are preferably further mobile terminals, communicate with the at least one transceiver unit 4 via the second and/or the at least one further (third) mobile communications cell 1b, 1c.

The access points 5a are configured to provide a WLAN connection for at least one mobile terminal 7a, 7b. This means that the mobile terminals 7a, 7b, which may also include the further mobile terminals 5b, 5c, can connect to the access points 5a via a WLAN connection 8a, 8b. This connection is subsequently passed on by the access points 5a, via the mobile communications connection thereof, to the at least one transceiver unit 4. This means that the mobile terminals 7a, 7b can access the data network 6 even if, for example in the absence of a suitable communications device (for example LTE modem), they are not configured to communicate with the at least one transceiver unit directly via the mobile communications cells 1a to 1c.

As will be explained later, the individual mobile communications cells 1a, 1b, 1c are preferably operated by different companies. The first mobile communications cell 1a, via which the access points 5a which provide a WLAN connection 8a, 8b are connected, is operated by a company which wishes to supply the building 2 or the campus with a WLAN connection 8a, 8b so as to provide extensive coverage. This company may also be a mobile communications company. By contrast, the mobile communications cells 1b, 1c are preferably operated by mobile communications companies which wish to ensure that their customers can still be reached inside the building 2 or campus.

The at least one transceiver unit is connected to a signal generation and/or processing unit 9. This signal generation and/or processing unit 9 is shown enlarged in FIGS. 4, 5 and 6. Generally, in these drawings, the dashed components of the signal generation and/or processing unit 9 are accommodated centrally at an operating company, while the components shown using a solid line are accommodated locally in the building 2 or campus.

FIG. 4 shows a possible construction of the signal generation and/or processing unit 9. The at least one transceiver unit 4 is connected to a first baseband unit 10a. The transceiver unit 4 is connected indirectly to the first baseband unit 10a. This means that a processing and/or distribution device 11 is connected between the at least one transmission unit 4 and the first baseband unit 10a. The processing and/or distribution device 11 is configured to pass on the signals generated by the first baseband unit 1 to the corresponding at least one transceiver unit 4. In the opposite direction, the processing and/or distribution device 11 is likewise configured to pass on the signals, received by the at least one transceiver unit 4, of the first mobile communications cell 1a to the first baseband unit 10a. The processing and/or distribution device 11 is able to convert the frequency of and/or to amplify the signals transmitted from the associated baseband unit 10a towards the at least one transceiver unit 4 or back. The processing and/or distribution device 11 may likewise further comprise various filters, in such a way that exclusively the signals intended for the first baseband unit 10a are passed on to said unit. Further transceiver units may also be connected to the processing and/or distribution device 11. The processing and/or distribution device 11 may also be referred to as a hub.

A direct connection of the first baseband unit 10a to the transceiver unit 4 would also be possible. In this case, the at least one transceiver unit 4 would have to obtain the required components for signal processing. Preferably, the transceiver unit 4 for the first baseband unit 10a would be actuated in a digital and/or analogue manner, preferably via a glass fiber cable. If the processing and/or distribution device 11 were used, the first baseband unit 10a would preferably likewise communicate with the processing and/or distribution device 11 via a digital connection (preferably a glass fiber).

More preferably, the processing and/or distribution device 11 and the first baseband unit 10a are formed in one piece. This means that the two devices are preferably accommodated in a shared housing. More preferably, it would also be possible for there to be a plurality of processing and/or distribution devices 11 which are connected to a shared first baseband unit 10a.

The processing and/or distribution device 11 and the first baseband unit 10a are accommodated in the building 2 or campus.

Further, the mobile communications transmission system 1 comprises a first control device 12a, which communicates with the first baseband unit 10a, an input/output of the first baseband unit 10a also counting for this purpose, and with a first gateway device 13a. The first control device 12a is preferably the control plane, and the first gateway device 13a is the user plane.

As stated previously, the first baseband unit 10a and the at least one transceiver unit 4 and the first gateway device 13a are installed in the building 2 or campus in which the at least one transceiver unit 4 provides the at least one mobile communications cell 1a. They are thus arranged locally.

By contrast, the first control device 12a is accommodated remote from the site of the first baseband unit 10a and the first gateway device 13a, at an operating company. It may be remote by a distance of a few kilometers to hundreds of kilometers.

The first control device 12a comprises a mobility management entity (MME) 14a and a first home subscriber server (HSS) 15a. The MME 14a serves to ensure control of the first mobile communications cell 1a. The first MME 14a also takes care of the management and registration of the at least one baseband unit 10a and the subscriber devices 5a. For this purpose, the first MME 14a is connected to the HSS 15a. All information about the subscriber devices 5a which is required for identifying the subscriber devices 5a and allowing them access to the access gateway 18 via the first mobile communications cell 1a is stored in the HSS 15a. Further, information is stored which is required for determining the site of the subscriber device 5a. Further, additional information is stored which is required for managing the services permitted for the associated subscriber device 5a. For this purpose, for example data about mobile access are stored, which include for example the phone number of the subscriber, the mobile communications identity of the subscriber (IMSI), keys required for authenticating the subscriber.

On the SIM, which may be soldered on or formed as a card and is installed for example in the subscriber device 5a (access point), further information is stored. This includes the universal integrated circuit card (UICC), which contains applications such as a universal subscriber identity module (USIM) and IP multimedia services identity module (ISIM). User data and authentication data for the UMTS LTE network are stored in the USIM. In the event of positive authentication, the associated subscriber device 5a is permitted to access the first gateway device 13a and therein the first packet data network gateway 17a.

For this purpose, the first gateway device comprises a first serving gateway (S-GW) 16a and a first packet data network (PDN). The serving gateway 16a passes on and routes the information which the subscriber device 5a wishes to pass on to the data network 6, which includes in particular the Internet. Further, packets which the corresponding subscriber device 5a wishes to receive by downlink from the data network 6 are buffered in the serving gateway 16a.

Via the packet data network gateway 17a, a connection between the subscriber devices 5a, 5b, 5c to the further data networks 6 is established. It also assigns a corresponding IP address to the subscriber devices 5a, 5b, 5c.

If the subscriber devices 5a, which according to FIG. 3 are access points, are positively identified, they can pass on their data to the packet data network gateway 17a. The required identification features are stored on the SIM card in the access points 5a. The access points 5a further have an IMEI (international mobile equipment identity). As stated previously, the first baseband unit 10a is a baseband unit 10a which is merely used for connecting the access points 5a. Via this first baseband unit 10a, Internet services can be offered in hotels. Guests can log on to the access points 5a using their mobile terminals 7a, 7b. As a result of the previous identification and authentication of the access points 5a and the authorization thereof, the mobile terminals 7a, 7b can pass on the data thereof via the WLAN connection 8a, 8b to the corresponding access points 5a, which in turn convey said data to the at least one transceiver unit 4. Via the at least one transceiver unit 4, these data are passed on to the first baseband unit 10a. The control plane of the first baseband unit 10a is connected to the first MME 15a. The first baseband unit 10a converts the signals of the at least one transceiver unit 4 into packets for the data processing and transmits these user data to the serving gateway 16a. The process takes place analogously for the receiving device (downlink). The serving gateway 16a has already been authorized by the MME 14a for these data, which have been received by the access points 5a, to be allowed to be transmitted onwards to the packet data network gateway 17a.

The packet data network gateway 17a could for example furthermore be connected directly to the data network 6. In FIG. 4, it can be seen that a further access gateway 18 is connected between the data network 6 and the packet data network gateway 17a. The access gateway 18 has the task of ensuring that only the data from mobile terminals 7a, 7b which have been identified to an accounting system 19 are passed on to the data network 6. The access gateway 18 may for example be configured as a password-protected. Web page, the user having to input the correct password, which he obtains for example at reception, in order for his mobile terminal 7a, 7b to be accordingly enabled. Only after successful authorization by the accounting system 19 are the data from the mobile terminals 7a, 7b put through to the data network 6. The accounting system 19 may also additionally be connected to a first authentication, authorization and accounting device 20a. This authentication, authorization and accounting device 20a may be connected to other authentication, authorization and accounting devices 20b, 20c (see FIG. 6). The other authentication, authorization and accounting devices 20b, 20c may be installed at mobile communications companies.

It should be emphasised that in an LIE network the access gateway is the packet data network gateway 17a, According example non-limiting embodiments, an additional access gateway 18 is used. However, rather than the LTE connections or subscribers, it takes care of the access points 5a or the mobile terminals 7a, 7b which communicate via the access points 5a and log into the WiFi network. There is thus a combination of an LIE connection, consisting of an LTE RAN (radio access network) and an LIE core network, and a WiFi system, the access points 5a and the access gateway 18 being separate and the access gateway 18 being controlled by an operating company. Communication between the (WiFi) access points 5a and the (WiFi) access gateway 18 takes place via the mobile communications connection. As stated previously, the mobile communications connection consists in particular of the baseband unit 10a, the serving gateway 16a, the packet data network gateway 17a, the mobility management entity (MME) 14a and the home subscriber server (HSS) 15a, The transceiver unit 4 and/or the processing and/or distribution device 11 may also be included.

In FIG. 3, the mobile terminals 7a, 7b comprise a SIM card on which corresponding user information is stored. Reference is made to the previous explanations. This user information may be transmitted to the access gateway 18. This passes said information on to the accounting system 19, which in turn passes it on to the first authentication, authorization and accounting device 20a. This may carry out accounting or settlement with the other authentication, authorization and accounting devices 20b, 20c which belong to the mobile communications provider of the corresponding subscriber. In the event of a positive response, the access gateway 18 acquires the information to pass the data traffic on to the data network 6. Identification of this type can be carried out by an EAP method. This includes in particular the EAP SIM method and the EAP AKA method.

The accounting system 19 and the first authentication, authorization and accounting device 20a preferably also belong to the first control device 12a. This means that these devices are installed centrally at an operating company. The corresponding user management takes place at these operating companies.

The centralized control plane (for example MME, HSS) reduces the installation and configuration complexity and makes it possible to use a cloud-based solution (high availability, load balancing). The control plane may further cooperate with other baseband units in other buildings and control them, as described at the outset.

It is also particularly advantageous that the access gateway 18 is connected to the data network 6 at the location of the building 2 or campus. This local data breakout prevents high data traffic or a high bandwidth requirement on the connection between the location of the service rendered, in other words the building 2, and the service provider, in other words the operating company, where the centralized control plane is located. In this case, it is sufficient to provide a wide-band connection to the data network 6 and a narrowband connection to the operating companies. The control data (control plane) are transmitted via the narrowband connection.

In principle, it would also be conceivable for all data to be transmitted to the data network via a shared connection (shared physical medium). In this case, the control data would preferably be transmitted to the operating company via an encrypted VPN (virtual private network).

Figure 5:
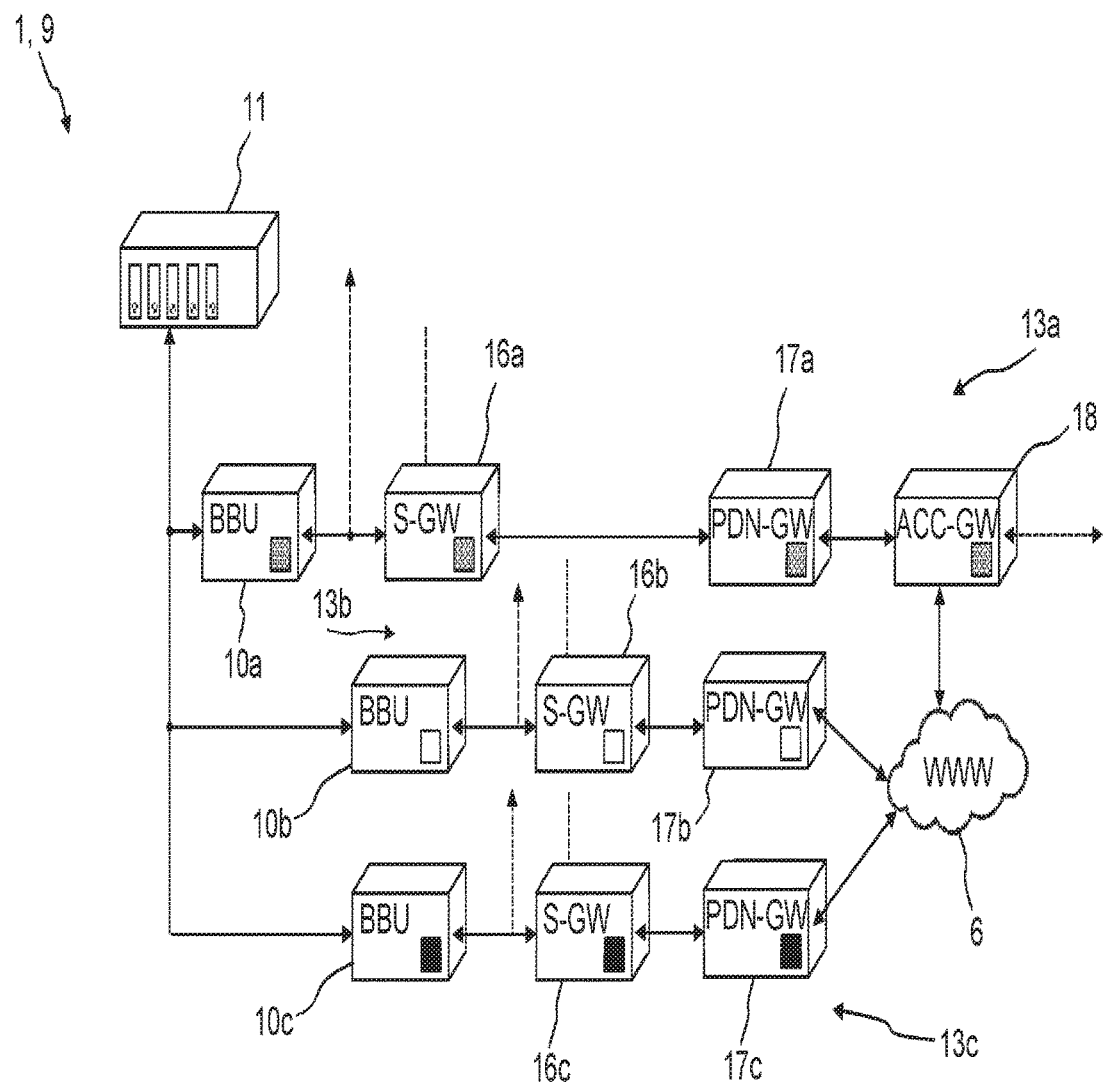
FIG. 5 is an overview of the mobile communications system along with three baseband units and the associated components of the control device and the gateway device, the connections to the control device being shown by a dashed line.

FIG. 5 further shows a second baseband unit 10b and at least one further (third) baseband unit 10c. All the baseband units 10a, 10b, 10c are connected to the processing and/or distribution device 11. Each baseband unit 10a, 10b, 10c generates signals which form the different mobile communications cells 1a, 1b, or are broadcast via said cells. The second baseband unit 10b is connected to a second gateway device 13b. The at least one further baseband unit 10c is connected to at least one further gateway device 13c. Via the second gateway device 13b and the at least one further gateway device 13c, the second baseband unit 10b and the at least one further baseband unit 10c are connectable or connected to the data network 6. The second and the at least one further baseband unit 10b, 10c are likewise in turn connected via the processing and/or distribution device 11 to the at least one transceiver unit 4 (indirect connection). A direct connection would also be possible. The processing and/or distribution device 11 may comprise one or more antennas. Each mobile communications cell 1a, 1b, 1c may be provided via its own antenna. The mobile communication cells 1a, 1b, 1c may also be provided via a shared antenna which is configured appropriately wide-band.

In FIG. 3, further subscriber devices 5b, 5c in the form of further mobile terminals 5b, 5c can be seen, which establish a mobile communications connection to the transceiver unit 4 via the second and the at least one further mobile communications cell 1b, 1c. The data conveyed to the transceiver unit 4 by the further mobile terminal 5b are passed on by said unit to the second baseband unit 10b. The second baseband unit 10b in turn passes them on to the data network 6 via the second gateway device 13b. The subscriber device 5c, in other words the further mobile terminal 5c, transmits the data thereof via the at least one further mobile communications cell 1c to the transceiver unit 4. This passes the data on to the at least one further baseband unit 10c. The at least one further baseband unit 10c transmits these data via the at least one further gateway device 13c to the data network 6.

The second baseband unit 10b and the at least one further baseband unit 10c are preferably operated by different companies from the first baseband unit 10a.

The second and/or the at least one further baseband unit 10b, 10c and the second and/or the at least one further gateway device 13b, 13c are installed in the building 2 or campus in which the at least one transceiver unit 4 provides the multiplicity of mobile communications cells 1a, 1b, 1c. The second and/or the at least one further gateway device 13b, 13c comprise a second and/or at least one further serving gateway 16b, 16c and a second and/or at least one further packet data network gateway 17b, 17c. The second and/or the at least one further packet data network gateway 17b, 17c are connected or connectable directly to the data network 6. An access gateway 18 is preferably not connected in between in this case, as shown in the first gateway device 13a in FIG. 5.

The construction of the second and the at least one further serving gateway 16b, 16c and of the packet data network gateway 17b, 17c corresponds to the construction of the first serving gateway 16a and the first packet data network gateway 17b as already described, reference hereby being made thereto.

Preferably, the access gateway 18 and the second and/or the at least one further packet data network gateway 17b, 17c are connected to the data network 6 via the same data connection. As a result, costs can be further reduced.

FIG. 5 further shows in dashed lines the connections to the associated control planes 12a, 12b and 12c. Via these connections, as described above, access to the gateway devices 13a, 13b, 13c is regulated and the baseband units 10a, 10b, 10c are controlled accordingly.

Figure 6:
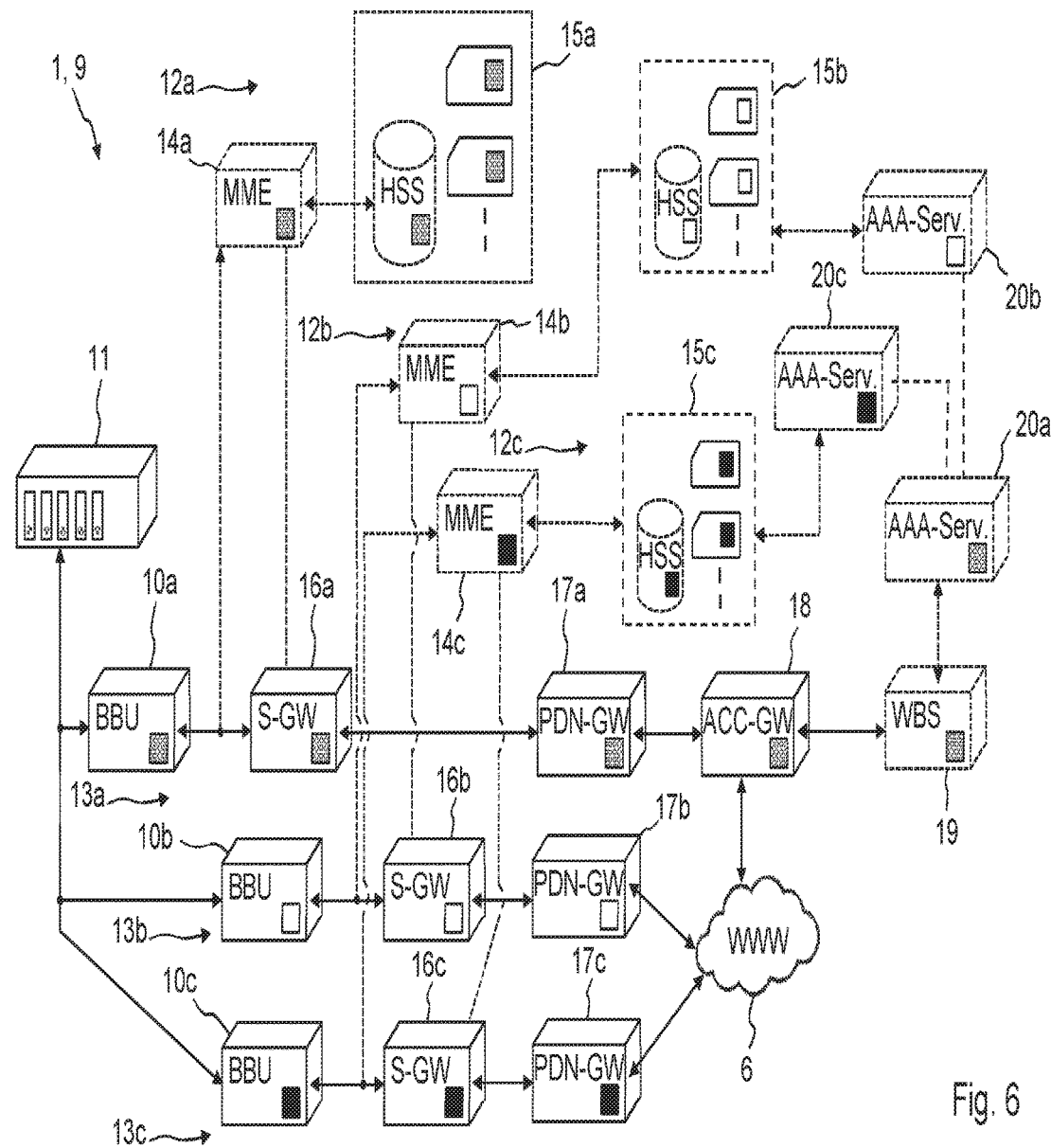
FIG. 6 is a further overview of the mobile communications system along with three baseband units and the associated components of the control device and the gateway device.

FIG. 6 shows the additional control planes 12a, 12b, 13b, which are merely indicated in dashed lines in FIG. 5.

The first mobility management entity 14a, the first home subscriber server 15a, the first authentication, authorization and accounting device 20a and the accounting system 19 have already been described previously with reference to FIG. 4. These subjects are located centrally with the operating company which operates the WLAN connections 8a, 8b in the building 2 or campus. These subjects are therefore shown in dashed lines.

The mobile communications transmission system 1 comprises, in the second and/or in the at least one further control device 12b, 12c, a second and/or at least one further mobility management entity (MME) 14b, 14c and a second and/or at least one further home subscriber server (HSS) 15b, 15c. Further, a second and/or at least one further authentication, authorization and accounting device 20b, 20c are preferably formed. It is particularly advantageous that the second and/or the at least one further authentication, authorization and accounting devices 20b, 20c are accessible from the first authentication, authorization and accounting device 20a. The second and the at least one further authentication, authorization and accounting device 20b, 20c do not have to be interconnected for mutual data exchange. The authentication, authorization and accounting devices 20a, 20b, 20c are accommodated centrally, in other words at the associated operating companies (for example mobile communications companies), and are managed there. As a result, the installation complexity inside the building 2 or campus is minimized.

As regards the mode of operation of the second and the at least one further MME 14b, 14c and of the second and the at least one further HSS 15b, 15c and of the second and the further authentication, authorization and accounting device 20b, 20c, reference is made to the descriptions for the first MME 14a, the first HSS 15a and the first authentication, authorization and accounting device 20a.

In principle, the first MME 14A and the first HSS 15a may also be accommodated at different operating companies. The same also applies to the second MME 14b and the second HSS 15b and to the at least one further MME 15c and the at least one further HSS 15c.

Preferably, all the gateway devices (13a, 13b, 13c) are connected to the data network via the same connection. All the control devices (12a, 12b, 12c) could also be connected to the associated baseband units (10a, 10b, 10c) via this connection, the connection being an encrypted connection. Preferably, however, the control devices (12a, 12b, 12c) are connected to the associated baseband units (10a, 10b, 10c) via a separate connection. In this case, the separate connection preferably uses either a different physical medium or a different logical connection, for example on the IP level. More preferably, each control device (12a, 12b, 12c) is connected via its own (physical) connection to the associated baseband unit (10a, 10b, 10c).

A further mobile terminal 5b, which exchanges data with the at least one transceiver unit 4 on the second mobile communications cell 1b, is allowed access to the second gateway device 13b in the event of correspondingly provided authorization by the second MME 14b. The second packet data network gateway 17b subsequently passes on the corresponding data packets to the data network 6.

The same also applies to the at least one further mobile terminal 5c, which is in a communications connection with the at least one transceiver unit 4 via the at least one further mobile communications cell 1c. The data are passed via the at least one further baseband unit 10c to the at least one further gateway device 13c and via this to the data network 6. This also only applies in the event of sufficient authorization, which is checked by the at least one further MME 14c. This subsequently controls the at least one further serving gateway 16c accordingly.

In principle, it is possible for a multiplicity of further transceiver units, each of which in turn provides a multiplicity of mobile communications cells 1a, 1b, to be connected to the processing and/or distribution device 11. The baseband units 10a, 10b, 10c may also be connected directly to the multiplicity of further transceiver units. The mobile communications cells 1a, 1b, 1c are preferably independent of one another, since the baseband units 10a, 10b, 10c are connected to mutually independent core network components. In other words, a plurality of (parallel) mutually independent mobile communications networks are provided.

The gateway devices 13a, 13b, 13c may each be formed together with the associated baseband unit 10a, 10b, 10c in a shared device. This shared device may in this case also additionally be inserted as a module into the processing and/or distribution device 11 or be part thereof.

In principle, the individual mobile communications cells 1a, 1b, 1c inside the building 2 or campus may be operated at different powers. As a result, the spatial extents of the individual mobile communications cells 1a, 1b, 1c can be adjusted individually.

The gateway devices 13a, 13b, 13c are in particular each a combination of the gateways of an LTE network and the gateway of a WiFi system.

The invention is not limited to the described embodiments. Within the scope of the invention, all features described and/or shown can be combined with one another in any desired manner.

Thus, while the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Mobile communications transmission system for a multiplicity of mobile communications cells in a building or campus, comprising:
 a first baseband unit and a first gateway device, the first baseband unit being connectable or connected via the first gateway device to a data network;
 at least one transceiver unit which is directly or indirectly connected to the first baseband unit by a wired connection;
 the at least one transceiver unit being configured to provide at least one first mobile communications cell so as by way of this first mobile communications cell to exchange information with at least one subscriber device located internal to the building or in the campus via a mobile communications connection, a data connection between the at least one subscriber device and the data network via the first baseband unit being established or establishable by way of this mobile communications connection;
 a first control device which is connected to the first baseband unit and the first gateway device;
 the first baseband unit, the at least one transceiver unit and the first gateway device being installed in the building or campus in which the at least one transceiver unit provides the at least one first mobile communications cell;
 the first control device being accommodated remote from a site of the first baseband unit, the at least one transceiver unit and the first gateway device, at an operating company;
 the mobile communications cells comprising LTE communications cells or LTE-A communications cells or LTE Advanced Pro communications cells;
 the first control device comprising a first mobility management entity and a first home subscriber server;
 the first gateway device comprising a first serving gateway and a first packet data network gateway;
 the first gateway device comprising an access gateway arranged between the packet data network gateway and the data network and configured to connect the packet data network gateway to the data network;
 the first control device comprising an accounting system and a first authentication, authorization and accounting device, the accounting system being connected to the access gateway and to the first authentication, authorization and accounting device;

the at least one subscriber device comprising at least one access point configured to (a) communicate with the at least one transceiver unit via the first mobile communications cell and (b) provide a WLAN connection for at least one mobile terminal;

the accounting system being configured to control the access gateway in such a way that the at least one mobile terminal can transmit data to the data network via the WLAN connection of the at least one access point and the mobile communications connection of the first mobile communications cell can transmit to the data network via the first baseband unit and the first serving gateway and the first packet data network gateway and the access gateway.

2. Mobile communications transmission system according to claim 1, wherein:

the first control device is part of the control plane; or the first gateway device and the first baseband unit are part of the user plane.

3. Mobile communications transmission system according to claim 2, further comprising:

a processing and distribution device which is connected to all the baseband units and to the at least one transceiver unit;

wherein:
 a) the processing and distribution device is configured to pass on the signals generated by the first baseband unit to the corresponding at least one transceiver unit; and the processing and distribution device is configured to pass on the signals received by the at least one transceiver unit from the first mobile communications cell to the first baseband unit; or b) the processing and distribution device is configured to pass on the signals generated by the second and the at least one further baseband unit to the corresponding at least one transceiver unit; and the processing and distribution device is configured to pass on the signals received by the at least one transceiver unit from the second or the at least one further mobile communications cell to the second or to the at least one further baseband unit.

4. Mobile communications transmission system according to claim 3, wherein:

the processing and distribution device is configured to convert the frequency of and to amplify the signals which are to be transmitted from the baseband units towards the at least one transceiver unit; and the processing and distribution device is configured to convert the frequency of and to amplify the signals which are to be transmitted from the at least one transceiver unit towards the baseband units.

5. Mobile communications transmission system according to claim 3, wherein:

a multiplicity of further transceiver units are connected to the processing and distribution device and are configured to provide a multiplicity of mobile communications cells.

6. Mobile communications transmission system according to claim 1, wherein:

the first authentication, authorization and accounting device is connectable to at least one further authentication, authorization and accounting device operated by another operating company.

7. Mobile communications transmission system according to claim 1, wherein:

the access gateway is connected to the data network via the same connection via which the first mobility management entity is connected to the first baseband unit; or the access gateway is connected to the data network via a different connection from the connection via which the first mobility management entity is connected to the first baseband unit.

8. Mobile communications transmission system according to claim 1, wherein:

together with the first home subscriber server, the first mobility management entity is configured to authorize access of the at least one access point via the first mobile communications cell and the first baseband unit and the first serving gateway and the first packet data network gateway to the access gateway.

9. Mobile communications transmission system according to claim 1, wherein:

the accounting system is configured to provide authorization by means of an Extensive Authentication Protocol (EAP) method, including the EAP Subscriber Identity Module (SIM) method or the EAP Authentication and Key Agreement (AKA) method, as to whether the at least one mobile terminal can transmit data to the data network; or the accounting system is configured to provide the authorization by use of a password query.

10. Mobile communications transmission system according claim 1, wherein:

a second or at least one further baseband unit and a second or at least one further gateway device, the second and/or the at least one further baseband unit being connectable or connected to the data network via the second or the at least one further gateway device;

the second or the at least one further baseband unit are connected directly or indirectly to the at least one transceiver unit;

the at least one transceiver unit being configured to provide a second or at least one further mobile communications cell so as by way of this second or at least one further mobile communications cell to exchange information with further subscriber devices located internal to the building or within the campus via a mobile communications connection, a data connection between the further subscriber devices and the data network via the second or the at least one further baseband unit being established or establishable by way of said mobile communications connections;

a second or at least one further control device which is connected to the second or the at least one further baseband unit and the second or the at least one further gateway device;

the second or the at least one further baseband unit and the second or the at least one further gateway device are installed in the building or campus in which the at least one transceiver unit provides the multiplicity of mobile communications cells;

the second or the at least one further control device are accommodated remote from the site of the second or the at least one further baseband unit, the at least one transceiver unit and the second or the at least one further gateway device, at the same operating company as the first control device or at least one further operating company.

11. Mobile communications transmission system according to claim 10, wherein:
the at least one transceiver unit is configured to operate the second or the at least one further mobile communications cell in a frequency range assigned to at least one mobile communications company which offers mobile communications services outside the building or campus.

12. Mobile communications transmission system according to claim 10, wherein:
the at least one transceiver unit is configured to operate the first mobile communications cell in a frequency range unused by mobile communications companies which operate mobile communications services outside the building or campus; or
the at least one transceiver unit is configured to operate the first mobile communications cell in a frequency range assigned to at least one mobile communications company which operates mobile communications services outside the building or campus.

13. Mobile communications transmission system according to claim 10, wherein:
the second or the at least one further control device comprise a second or at least one further mobility management entity and a second or at least one further home subscriber server;
the second or the at least one further control device comprise a second or at least one further authentication, authorization and accounting device;
the second or the at least one further authentication, authorization and accounting device are accessible from the first authentication, authorization and accounting device.

14. Mobile communications transmission system according to claim 13, wherein:
the second packet data network gateway is connected to the data network via the same connection via which the second mobility management entity is connected to the second baseband unit;
the second packet data network gateway is connected to the data network via a different connection from the connection via which the second mobility management entity is connected to the second baseband unit;
the at least one further packet data network gateway is connected to the data network via the same connection via which the at least one further mobility management entity is connected to the at least one further baseband unit; or
the at least one further packet data network gateway is connected to the data network via a different connection from the connection via which the at least one further mobility management entity is connected to the at least one further baseband unit.

15. Mobile communications transmission system according to claim 13, wherein:
the at least one subscriber device is at least one further mobile terminal;
the at least one further mobile terminal is configured to establish a mobile communications connection with the second or the at least one further baseband unit via the second or the at least one further mobile communications cell;
the second or the at least one further mobility management entity is configured to authorize access of the at least one further mobile terminal via the second or the at least one further mobile communications cell and the second or the at least one further baseband unit and the second or the at least one further serving gateway and the second or the at least one further packet data network gateway to the data network.

16. Mobile communications transmission system according to claim 10, wherein:
the second or the at least one further gateway device comprise a second or at least one further serving gateway and a second or at least one further packet data network gateway;
the second or the at least one further packet data network gateway are connected or connectable to the data network.

17. Mobile communications transmission system according to claim 1, wherein:
the mobile communications cells are configured as microcells and cover a region having a diameter of less than 50 m, less than 40 meters or less than 30 meters.

18. Mobile communications transmission system for a mobile communications cell in a building or campus, comprising:
a gateway device comprising:
a serving gateway,
a packet data network gateway, and
an access gateway arranged between the packet data network gateway and a data network and configured to connect the packet data network gateway to the data network,
a baseband processor located at a baseband processing site and being connectable or connected via the gateway device to the data network;
at least one transceiver directly or indirectly connected to the baseband processor by a wired connection;
the baseband processor, the at least one transceiver and the gateway device being installed in the building or campus in which the at least one transceiver provides at least one mobile communications cell comprising LTE communications cells or LTE-A communications cells or LTE Advanced Pro communications cells;
the at least one transceiver being configured to provide the at least one mobile communications cell to exchange information with at least one subscriber device located internal to the building or in the campus via a mobile communications connection, the at least one subscriber device comprising at least one access point configured to communicate with the at least one transceiver via the at least one mobile communications cell to provide a WLAN connection for at least one mobile terminal;
a data connection between the at least one subscriber device and the data network via the baseband processor being established or establishable by way of the mobile communications connection; and
a controller connected to the baseband processor and the gateway device, the controller being accommodated at an operating company remotely from the baseband processor site, the at least one transceiver and the gateway device, the controller comprising a mobility management entity and a home subscriber server, the controller comprising an accounting system and a first authentication, authorization and accounting device, the accounting system being connected to the access gateway and to the first authentication, authorization and accounting device, the accounting system being configured to control the access gateway in such a way that the at least one mobile terminal is capable of transmitting data to the data network via the WLAN connection of the at least one access point, and the mobile communications connection of the at least one mobile communications cell is capable of transmitting to the data network via the baseband processor and the serving gateway and the packet data network gateway and the access gateway.

19. The system of claim 18 wherein the data network comprises the Internet, and the system routes user data over a first communications path to the Internet via the WLAN connection and routes administration data over a second communications path different from the first communications path to the mobile communication cell.

* * * * *